United States Patent Office 3,748,234
Patented July 24, 1973

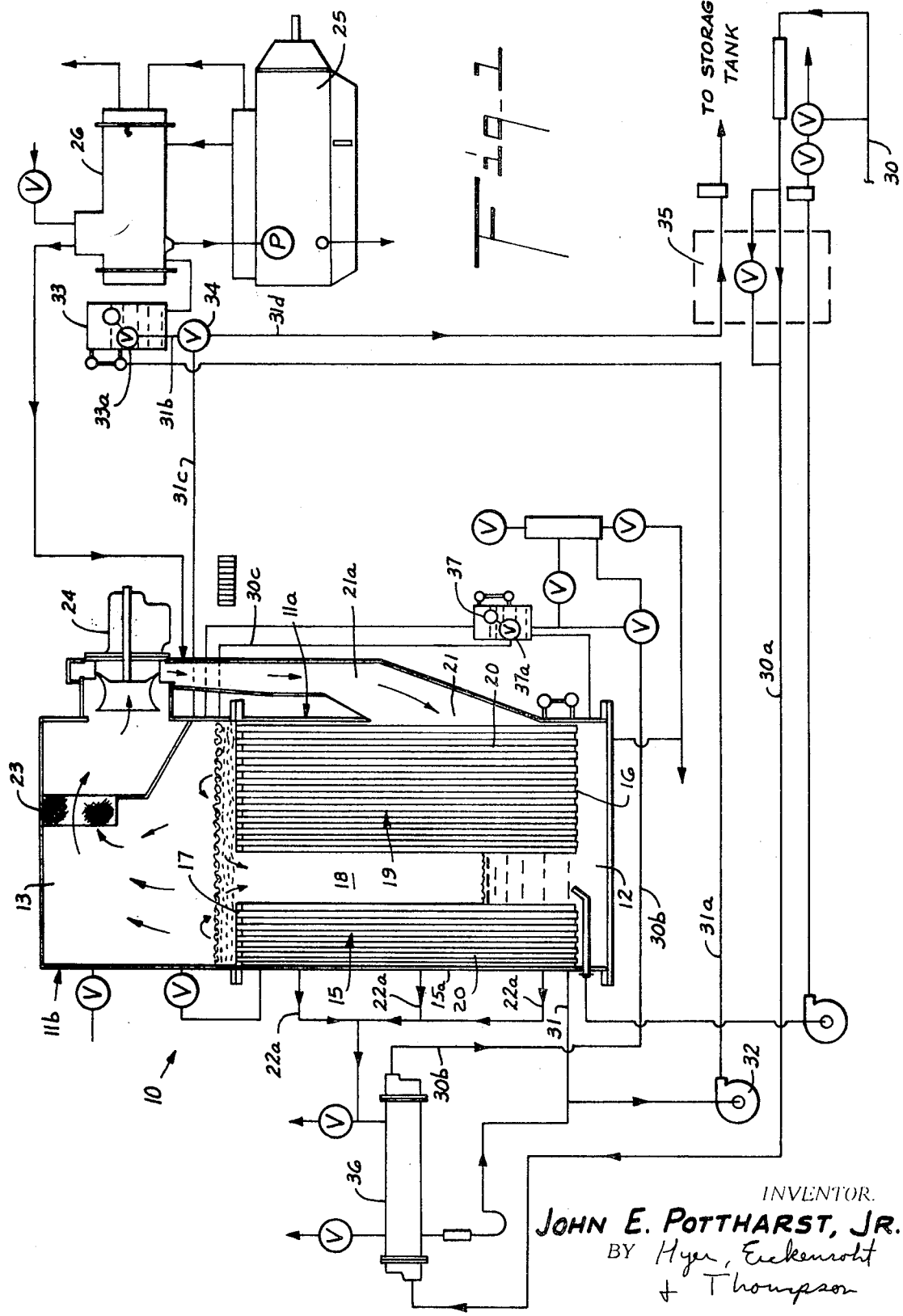

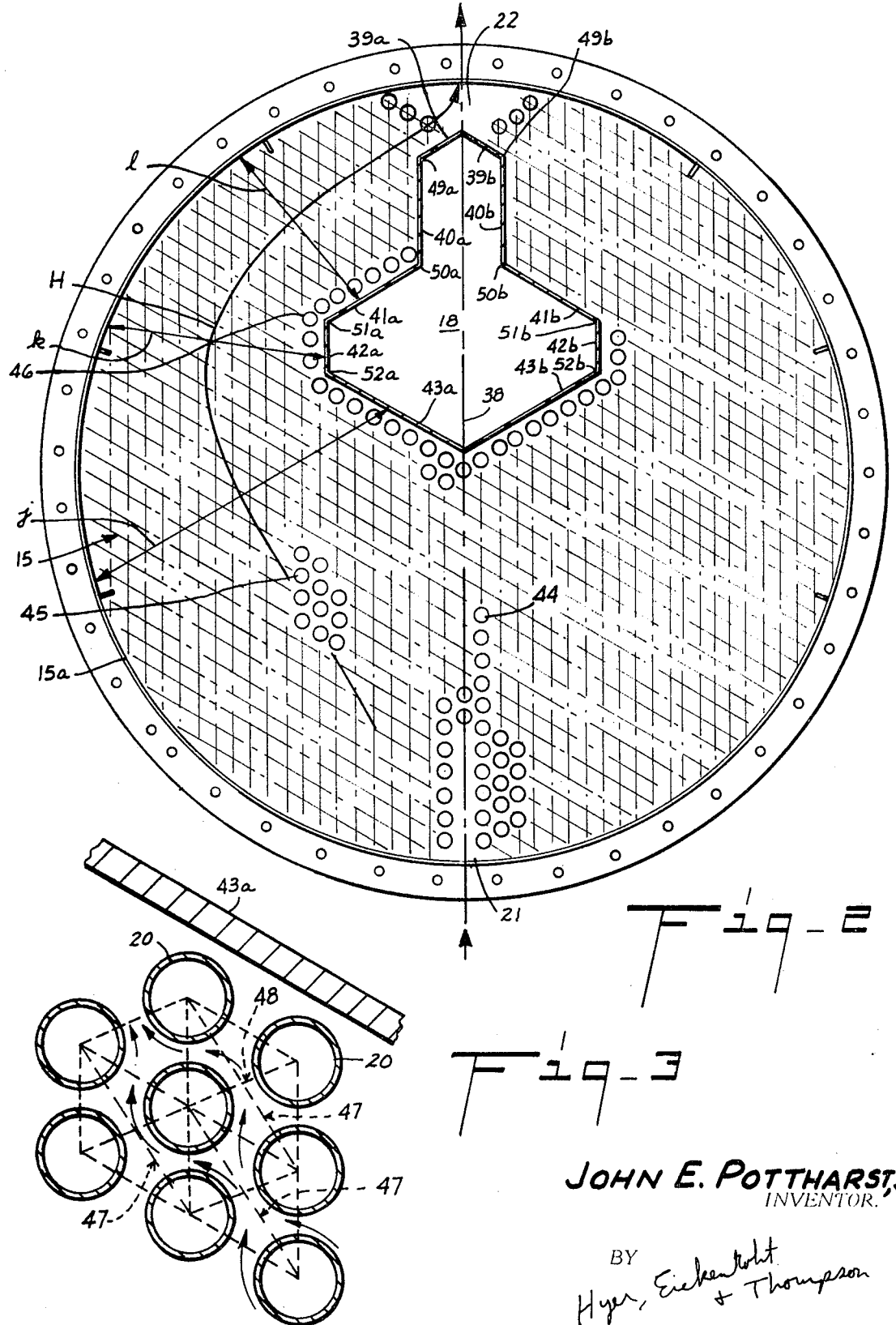

3,748,234
LIQUID DISTILLATION UNIT WITH
POLYGONAL DOWNCOMER
John E. Pottharst, Jr., 861 Carondelet St.,
New Orleans, La. 70130
Filed Aug. 19, 1969, Ser. No. 851,251
Int. Cl. B01d 3/00
U.S. Cl. 202—187                                  8 Claims

ABSTRACT OF THE DISCLOSURE

A liquid distillation unit is disclosed including an improved calandria formed by an outer shell and spaced tube sheets. A downtake conduit passes through the calandria and through and between the tube sheets and is surrounded by a plurality of heat exchange tubes passing between and through the tube sheets. The calandria includes an inlet and an outlet located on opposite sides so that vapor passes from the inlet across the heat exchange tubes to the outlet. The heat exchange tubes are arranged between the inlet and the outlet in multiple, parallel first rows substantially parallel with the axis passing through the inlet and outlet. Heat exchange tubes in adjacent first rows are offset with respect to each other, thus arranging the tubes in second and third multiple, parallel rows at acute angles with the first rows. The downtake conduit is located adjacent the outlet and its walls form a polygonal outline in cross-section generally symmetrical about the axis between the inlet and the outlet. Each of the walls of the downtake conduit are parallel to one of said first, second or third rows and are closely spaced to the heat exchange tube in adjacent rows. The walls of the downtake conduit are also proportioned and located with respect to the outer shell to provide a flow space for the vapor around the tubes and between the downtake conduit and the outer shell which is reduced in the flow direction from the inlet toward the outlet for maintaining the vapor velocity more constant as it flows toward the outlet than would be the case if the downtake conduit were not so proportioned and located.

---

This invention relates to vapor compression type sea water distillation units and to an improvement therein involving a calandria which aids in improving the overall efficiency of the unit.

The distillation of seawater by the vapor compression process is well known in the art. The distillation unit used to practice this process includes a calandria which is usually a tube and shell heat exchange for transferring heat from the compressed vapors to the seawater to be distilled. The compressed vapors or steam are usually on the shell side of the calandria while the seawater is on the tube side. The efficiency with which this heat transfer can be effected is in large part determinative of the overall efficiency of the distillation unit. One of the problems encountered in the design of an efficient calandria is the "clogging" of the heat exchange surfaces with non-condensables (usually air) in the compressed vapor. As the vapor (including the air) enters the calandria from an inlet and flows toward an outlet, the steam portion of it condenses as the vapors decrease and hence their velocity decreases. The velocity can become low enough that the non-condensables will tend to accumulate on portions of the heat exchange tubes, particularly those nearest the outlet. This effectively reduces the overall heat transfer efficiency so that only a portion of the area afforded by the tubes is operating at full efficiency.

Attempts have been made to solve this problem by arranging the pattern of the heat exchange tubes to be such that the flow space between them decreases from the inlet toward the outlet thereby hopefully maintaining the velocity sufficient that the non-condensables will be swept out of the calandria. However, this requires irregular spacing of the tubes resulting in several disadvantages, not the least of which is increased cost of the calandria. Other suggested solutions have involved various arrangements of baffles among the tubes, but these have had various disadvantages such as "blind spots" where non-condensables would collect to blank off heat exchange area, and areas where condensed distillates would collect in a more or less stagnant condition and become sources of corrosion due to absorption of carbon dioxide in the distillate.

It is an object of this invention to provide a vapor compression type of seawater distillation unit wherein the calandria has a relatively large downtake conduit for passing seawater to be distilled downwardly therethrough and a plurality of vertically extending tubes in which the distillation largely takes place, all arranged such that the vapor velocity across the tubes can be optimized to reduce the collection of non-condensables thereon by maintaining sufficient velocity across the entire calandria to sweep the non-condensables therefrom.

Another object is to provide such a unit in which the downtake conduit and the tubes are arranged to maintain the vapor velocity between the inlet and the outlet substantially uniform in the sense that the vapor velocity is maintained high enough to sweep non-condensables from the calandria and at the same time minimize by-passing of the vapors along the walls of the downtake conduit so that there will be a maximum exposure of them to the surfaces of the tubes.

These and other objects of the invention will be apparent to one skilled in the art upon the consideration of the written specification, the appended claims and the attached drawings wherein:

FIG. 1 is a schematic and flow diagram of a vapor compression seawater distillation plant utilizing the distillation unit of this invention, and showing the liquid distillation unit in cross-section;

FIG. 2 is a top view of the calandria of the distillation unit of FIG. 1, and

FIG. 3 is an enlarged view of a portion of FIG. 2 showing the preferred arrangement of heat exchange tubes.

Referring to FIG. 1, a vapor compression distillation plant is illustrated including a distillation unit 10 and the necessary conventional apparatus connected to it for operation. Since the construction and operation of much of this apparatus is well known, the following description will be limited to that structure and operation necessary to understand this invention.

Distillation unit 10 includes a vertical housing including a lower section 11a having a liquid region 12, and an upper section 11b having an upper vapor region 13. A calandria 15, which is cylindrical in cross-section, extends vertically from liquid region 12 up to vapor region 13. Calandria 15 includes an outer shell 15a which may be formed by the outer wall of section 11a, a tube sheet 16, forming the bottom of calandria 15, and a tube sheet 17 forming the top of calandria 15. A downtake conduit 18 passes through each of the tube sheets 16 and 17 and is in open communication with liquid region 12 and vapor region 13. Shell 15a, tube sheets 16 and 17, and the walls of the downtake conduit 18 are all connected together in fluid tight relationship to form a vapor or steam chest 19 in calandria 15. Also, a plurality of vertically extending heat exchange tubes 20 are arranged in vapor chest 19 about downtake conduit 18, and pass through and between tube sheets 16 and 17 so that they are also in open communication with lower liquid region 12 and upper vapor region 13. Vapor chest 19 has an inlet 21 for receipt of compressed vapors formed by an open in shell 15a and a tubular conduit 21a connected to shell 15a about this opening. Uncondensed vapors exhaust from vapor chest 19 through one or more outlets 22 which are located on the opposite side of calandria 15 from inlet 21 an on an inlet-outlet axis 38 passing through the inlet and outlet, respectively. Outlets 22 are also formed by one or more openings in shell 15a each communicating with conduits 22a to exhaust vapors from vapor chest 19.

Upper vapor region 13 in section 11a includes a demister 23 for drying vapors rising from calandria 15, and compressor 24 into which vapors from demister 23 discharge. Compressor 24 is located between upper vapor region 13 and conduit 21a connected to inlet 21, and withdraws vapor from vapor region 13 and demister 23, and discharged compressed vapors into vapor chest 19.

Compressor 24 is driven by an engine 25. The exhaust from engine 25 is connected to a flash tank exhaust boiler 25. Water is circulated through the engine to cool the engine and heat the water, and water is further heated by heat exchange with the exhaust gas from the engine in boiler 26. In this maner, a quantity of steam may be found which can be used in starting the distillation process.

A feed stream of hot seawater is injected through the line 30c into vapor region 13 above tube sheet 17 and calandria 15. For the purpose of preheating the feed stream, it is passed from an inlet line 30 into a heat exchanger 35, and from heat exchanger 35 through line 30a connected thereto to a vent condenser 36. The heated feed stream is then passed through line 30b conected to vent condenser 36 to an accumulator 37, which is controlled by a float valve 37a and from accumulator 37 to line 30c in controlled amounts. Line 30c preferably terminates in an open, flattened end which allows the hot seawater feed to be flooded over the top of the tube sheet 17.

The distillate formed in calandria 15 is withdrawn from the bottom of vapor chest 19 through line 31 and conducted to a storage tank (not shown) after cooling in a conventional maner. A portion of the distillate, which is warm, may be used for heat exchange with the feed stream to warm the latter, and as a source of fresh water for replenishing tank 36 when steam is drawn therefrom. As shown, for this purpose the distillate is conducted by a pump 32 which is connected to line 31, through line 31a to an accumulator 33, from which a portion of the distillate discharges into boiler 26. Another portion of the distillate stream passes from accumulator 33 through a float operated valve 33a and line 31b connected thereto to a two-way valve 34. Valve 34 is connected to line 31c which is connected to section 11a so that distillate may be recirculated, if desired. Valve 34 is also connected to line 31d connected to heat exchanger 35 through which the cool feed stream passes before passing into line 30c and unit 10. Cooled distillate is fed from the heat exchanger 35 to a storage tank (not shown) for storage.

Also, the vapor that has vented through vents 22 is warm and may be conducted from conduits 22a to vent condenser 36 in heat exchange with the feed stream to further aid in heating the feed stream.

The details of construction of the improved calandria of this invention are shown in FIGS. 2 and 3. Not all of tubes 20 are shown in these views, but a sufficient number are shown to explain the invention. As illustrated in FIG. 2 inlet 21 and outlets 22 are located on opposite sides of the wall of shell 15a of calandria 15, and lie on a common inlet-outlet axis 38. Downtake 18 includes a number of sperate walls 39a, 39b, 40a, 40b, 41a, 41b, 42a, 42b, 43a, and 43b, which are joined together to form a tubular downtake 18 having a polygonal outline in cross-section which is symmetrical about inlet-outlet axis 38. One side of downtake 18 formed by walls 39a and 39b is located adjacent outlet 22 and its other side formed by walls 43a and 43b is adjacent the center of calandria 15. Heat exchange tubes 20 are uniformly spaced about downtake 18 and are located on a plurality of first rows 44 running parallel to inlet-outlet axis 38. Tubes 20 in adjacent parallel first rows 44 are offset in the direction of inlet axis 38 with respect to adjacent tubes 20 in adjacent parallel first rows 44. With this arrangement, each tube 20 and adjacent tubes on the next adjacent first rows are also located in second rows 45 and third rows 46 of tubes which are each at an acuate angle with respect to first rows 44. As a further result of such an arrangement all adjacent tubes not in the same rows form a diamond pattern with respect to each other. Each tube 20 is located at an apex of a diamond and each diamond formed has a long diagonal 47 and short diagonal 48 as illustrated in FIG. 3. The distribution of tubes 20 about downtake 18 in the diamond patterns described, results in arrangement of tubes which permits flow of vapor from inlet 21 to outlet 22 substantially along long diagonals formed by the diamonds. As illustrated by the arrows representing flow of vapor in FIG. 3, flow of vapor about tubes 20 and along long diagonals 47 results in few blind spots to flow and a continuous sweeping of non-condensables that form from the outer surface of tubes 20, whereas flow along short diagonals 48 provides little sweeping of non-condensables from between tubes 20.

In the arrangement of tubes 20 described, a number of tubes 20 are not placed along the axis 38 in the area adjacent inlet 21 and outlet 22 so that voids are formed in these areas. The void area in the region of inlet 21 is provided so that vapor coming into this region will be distributed, and substantially equal amounts of the vapor will flow through the spaces between adjacent tubes 20 surrounding the void area. Preferably the void area formed in the region of inlet 21 is substantially equal to the area of the spaces between tubes 2 surrounding the area, so that uniform distribution is obtained.

As illustrated in FIG. 2, downtake 18 is preferably formed so that it has a first portion consisting of walls 39a, 39b, 40a and 40b, adjacent outlet 22 of substantially less lateral dimension (the direction perpendicular to axis 38) than the lateral dimension in the same direction of a second portion of downtake 18 consisting of walls 41a, 41b, 42a, 42b, 43a and 43b. With this arrangement, the flow space in vapor chest 19 between inlet 21 and outlet 22 is progressively reduced in size or squeezed down in the direction of flow from the inlet to the outlet, so that a substantially constant rate of flow is maintained as the flow pressure decreases. The walls of the downtake on each side of axis 38 are so located with respect to shell 15a to provide the proper dimension of the vapor chest at any point along the flow path to insure substantially uniform rates of flow. This is preferably done by plotting a centerline H of the flow of vapor between the inlet 21 and outlet 22 and laying out lines j, k, and l, etc. normal to this centerline H and running from shell 15a toward the center of the calandria only so far as a flow across them is substantially constant. The ends of these lines toward the center of calandria 15 thus form the general outline of downtake 18.

However, in order to avoid bypassing a vapor between the walls of downtake 18 and adjacent rows of heat exchange tubes 20, it is necessary that the walls of downtake 18 be spaced closely to adjacent heat exchange tubes. Thus, it is not always possible to place the walls of the downtake on the general outline formed. A suitable arrangement is provided which closely follows the general outline mentioned above and provides the desired adjacent spacing, by laying out each separate walls 39a–43b of downtake 18 parallel to one said first, second and third rows, and spacing the adjacent heat exchange tubes close to the respective wall. With this arrangement, it is not necessary to provide baffles along the walls of the downtake to prevent vapor bypassing. Also, in the preferred arrangement to be described, the laying of the walls of downtake 18 parallel to said first, second and third rows, also substantially fulfills the requirement of laying out these walls at points along the end of lines j, k, and l, normal to centerline H and defining a region of substantially constant vapor flow velocity.

As illustrated in FIG. 2, walls 39b and 41b are located on the right side of axis 38 and are parallel to second rows 45; walls 39a and 41a are located on the left side of axis 38 and are parallel to third rows 46, walls 40a and 42a are located on the left side of axis 38 and parallel to first rows 44, walls 40b and 42b are located on the right side of axis 38 and parallel to first rows 44; walls 43b located on the right side of axis 38 is parallel to third rows 46, and wall 43a located on the left side of axis 38 is parallel to second rows 45. Walls 39a and 39b form first and second walls joined at axis 38 and extending towards the center of calandria 15. They terminate at first junctions 49a and 49b where they are joined to walls 40a and 40b respectively, which form third and fourth walls extending from junctions 49a and 49b towards the center of calandria 15. Walls 40a and 40b end at second junctions 50a and 50b respectively where they are joined with walls 41a and 41b, respectively, forming fifth and sixth walls extending toward the center of calandria 15. Walls 41a and 41b, respectively end at third junctions 51a and 51b where they are joined by walls 42a and 42b, respectively, which form seventh and eighth walls extending towards the center of calandria 15. Walls 42a and 42b end at fourth junctions 52a and 52b respectively where they are joined by walls 43a and 43b respectively which form ninth and tenth walls extending from junctions 52a and 52b respectively to where they intersect and are joined together on axis 38, forming a closed polygon.

In the preferred embodiment of calandria 15 illustrated in FIG. 2, the acute angles between second rows 45 and third rows 46 of tubes 20 and first row 22 are 60°. With this angular relationship, the diamonds formed from the pattern of tube spacing that results are of sufficient length to permit considerable sweeping of non-condensables from tubes 20 by flow along long diagonals while permitting a minimum pressure drop by such flow. Also, the arrangement of downtake 18 wherein each of the walls of the downtake are parallel to one of said first, second and third rows is simplified, with each wall being joined at a 120° angle with adjacent walls.

In operation, warmed sea water is injected over tube sheet 17 through pipe 30c, floods over the top of calandria 15 and runs through downtake 18 into liquid region 12. Violent boiling occurs in this region in tubes 20 as warm steam is passed in heat exchange with these tubes through vapor chest 19, and vapor is drawn up through tubes 20 into the lower pressure vapor region 13. As the rising vapor emerges from tubes 20 into vapor region 13, four or five inches of froth is formed over the top of tube sheet 17 and it is into this froth that the feed passes. Thus, a portion of the water in liquid region 12 is vaporized to form steam as it passes from region 12 into vapor region 13, and this vapor is drawn up through demister 23 where it is dried, after it emerges into region 13. The liquid released in demister 23 falls on top of tube sheet 17 and runs through downtake 18 with the feed stream. Vapors emerging from demister 23 are compressed by compressor 24 and are injected at a higher pressure as steam through conduit 21a and into inlet 21. The steam passes from inlet 21 to outlet 22, through vapor chest 19 and about tubes 20, in heat exchange with liquid and vapor from the feed stream in these tubes. As the steam is cooled liquid distillate is separated out and run down tubes 20 to the bottom of calandria 15 where it is collected and withdrawn. The vapors not condensed are discharged out outlet 22.

In order to start the process described above, initially hot steam may be injected from boiler 26 and directed into conduit 21a and inlet 21 until the cycle is able to carry on by itself.

As the steam obtained by vaporizing feed seawater passes through vapor chest 19 and condenses, non-condensables collect on heat exchange tubes 20. With the arrangement described above wherein flow is substantially along the long diagonals of the diamonds formed by adjacent heat exchange tubes, a substantial amount of these non-condensables are swept from behind the heat exchange tubes so that vapor flow across the tubes is not impeded.

From the foregoing description of one embodiment of this invention by way of example, it will be seen that this invention is one well adapted to attain all of the ends and objects hereinabove set forth, together with other advantages which are obvious and which are inherent to the apparatus and structure.

What is claimed is:

1. In a liquid distillation unit including a lower liquid region and an upper vapor region, a calandria extending from said liquid region to said vapor region and including a vertically disposed outer shell enclosed at its top and bottom by parallel tube sheets, and means communicating with said vapor region and said calandria for discharging vapor from said vapor region into said calandria, the improvement in said calandria comprising a vapor inlet to said outer shell in communication with said means for receipt of vapors from said vapor region; an outlet from said outer shell and located on the opposite side of said calandria from said inlet and substantially on an inlet-outlet axis passing through the inlet; a plurality of substantially uniformly spaced, parallel, heat exchange tubes extending through and between said tube sheets, said tubes being arranged in multiple, parallel first rows with the tubes in each first row being offset in the direction of said first rows from the tubes in the next adjacent first row and said tubes also being arranged in second and third rows of tubes respectively at acute angles with said first rows whereby the tubes are arranged in a diamond pattern; a downtake conduit adjacent the outlet and extending between and through said tube sheets and having vertical walls forming a polygonal outline in cross section generally symmetrical about said inlet-outlet axis, each of said walls being parallel to one of said first, second, or third rows and closely spaced to the tubes in the adjacent parallel row for minimizing vapor by-passing along the outer surface of said downtake, each wall of the downtake conduit being proportioned and located with respect to said outer shell to provide a flow space for vapor around the tubes and between the downtake conduit and said outer shell which is reduced in the flow direction from the inlet toward the outlet for maintaining vapor velocity substantially constant as it flows towards said outlet.

2. The distillation unit of claim 1 wherein said downtake conduit in cross-section outline includes a first portion adjacent said outlet and a second portion adjacent the central vertical axis of said calandria and connected to said first portion to form a closed polygon, the space between opposite walls of said first portion being small compared to the space between opposite walls of said second portion.

3. The distillation unit of claim 2 wherein said first portion includes first and second walls joined at said inlet-outlet axis and extending toward the center of said calandria and ending at points substantially equal distance from said outlet-inlet axis, third and fourth walls each joining one of said first and second walls at said end points to form first junctions and extending along a first row from said first junctions, at equal distance from said inlet-outlet axis and ending at points equal distance from said first junctions, said second portion including fifth and sixth walls each joined to one of said third and fourth walls at their end points to form second junctions, each of said fifth and sixth walls extending from said second junctions toward the center of said calandria and away from said inlet-outlet axis and parallel to one of said first and second walls, and ending at points substantially the same distance from said inlet-outlet axis, seventh and eighth walls joined to said fifth and sixth walls at their end points to form third junctions and each extending from said third junctions along one of said first rows toward the center of said calandria and ending at points substantially the same distance from said third junctions, and ninth and tenth walls joined to said seventh and eighth walls at their end points and each extending along one of said second and third rows towards said inlet-outlet axis and being joined to each other substantially on said inlet-outlet axis.

4. The distillation unit of claim 1 wherein said acute angles between said first rows and said second and third rows are 60°.

5. The distillation unit of claim 4 wherein the downtake conduit includes a plurality of walls joined together to form a closed polygon and each wall is joined to an adjacent wall at an angle of 120°.

6. The distillation unit of claim 1 wherein the area of the inlet in said calandria is substantially equal to the spaces between the adjacent heat exchange tubes about the inlet.

7. The distillation unit of claim 1 wherein said first rows are substantially parallel to said inlet-outlet axis.

8. In a vapor compression distillation unit wherein a tube and shell calandria is disposed to exchange heat from condensing compressed vapors on the shell side to liquid being distilled on the tube side, said calandria including a plurality of vertical tubes extending between opposed horizontal tube sheets and arranged in a diamond pattern, that improvement comprising an inlet and an outlet disposed on opposite sides of said calandria and a vertical downtake conduit extending between said tube sheets and located adjacent said outlet and spaced laterally from said inlet, said downtake conduit being a polygonal shape in cross-section with each side thereof being parallel to an adjacent row of tubes and being closely adjacent to such row to minimize vapor by-passing between such row and said downwtake conduit, said downtake conduit having its sides positioned so that it has a portion of large cross-section spaced from the inlet and a portion of smaller cross-section intermediate said large portion and said outlet and arranged so that the flow space around the tubes and between the sides of the downtake conduit and shell is reduced in the direction of flow toward said outlet.

References Cited
UNITED STATES PATENTS

| | | | |
|---|---|---|---|
| 1,275,231 | 8/1918 | Dow et al. | 165—108 |
| 2,487,884 | 11/1949 | Lunt | 203—24 |
| 3,192,130 | 6/1965 | Pottharst | 203—11 X |
| 3,360,037 | 12/1967 | Ammon | 165—158 |
| 3,333,630 | 8/1967 | Charcharos | 165—158 |

NORMAN YUDKOFF, Primary Examiner

D. EDWARDS, Assistant Examiner

U.S. Cl. X.R.

202—189, 235; 165—159; 203—24, 26